(12) United States Patent
Sasagawa

(10) Patent No.: US 10,951,781 B2
(45) Date of Patent: Mar. 16, 2021

(54) INFORMATION PROCESSING APPARATUS THAT DISPLAYS A CONFIRMATION SCREEN IF DISPLAY LANGUAGES OF A SCREEN AND AN OPERATION OBJECT DO NOT MATCH, METHOD OF CONTROLLING THE SAME, AND STORAGE MEDIUM

(71) Applicant: CANON KABUSHIKI KAISHA, Tokyo (JP)

(72) Inventor: Naoto Sasagawa, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/732,818

(22) Filed: Jan. 2, 2020

(65) Prior Publication Data
US 2020/0259968 A1 Aug. 13, 2020

(30) Foreign Application Priority Data
Feb. 12, 2019 (JP) .............................. JP2019-022947

(51) Int. Cl.
*H04N 1/00* (2006.01)
*G06F 3/0481* (2013.01)

(52) U.S. Cl.
CPC ..... *H04N 1/00498* (2013.01); *G06F 3/04812* (2013.01); *G06F 3/04817* (2013.01); *H04N 1/00384* (2013.01); *H04N 1/00395* (2013.01); *H04N 1/00411* (2013.01)

(58) Field of Classification Search
None
See application file for complete search history.

(56) References Cited

U.S. PATENT DOCUMENTS

| 5,936,416 A * | 8/1999 | Tanaka ................... G01R 1/025 324/756.01 |
| 9,098,197 B2* | 8/2015 | Suese .................. G06F 3/04886 |
| 2012/0010871 A1* | 1/2012 | Ichimi ..................... G06F 9/454 704/8 |
| 2015/0296097 A1* | 10/2015 | Kawashima ....... H04N 1/32496 358/474 |
| 2017/0075635 A1* | 3/2017 | Maemura ............... G06F 3/1285 |
| 2018/0376014 A1* | 12/2018 | Nakai ................ H04N 1/00498 |

FOREIGN PATENT DOCUMENTS

JP 2009-205325 A 9/2009

\* cited by examiner

*Primary Examiner* — Thomas D Lee
(74) *Attorney, Agent, or Firm* — Venable LLP

(57) ABSTRACT

The present invention provides an information processing apparatus having a display unit that displays a screen on which a pointing tool corresponding to a function is disposed. The information processing apparatus obtains a display language of the screen and obtains a language of the pointing tool, and in a case where the display language differs from the language, displays, on the display unit, a confirmation screen for confirming with a user whether to execute the function corresponding to the pointing tool in response to an instruction given by the user via the pointing tool.

21 Claims, 8 Drawing Sheets

FIG. 5

APPLICATION MANAGEMENT

| APPLICATION NAME | STATE | |
|---|---|---|
| 501 — FIXED ADDRESS SCAN | ENABLED | DISABLED — 502 |
| ECO SETTING SWITCHING | ENABLED | DISABLED |
| LANGUAGE SWITCHING | ENABLED | DISABLED |

FIG. 6

FIXED ADDRESS SCAN SETTING SCREEN

REGISTRATION OF NEW BUTTON — 601

BUTTON NAME

Application A        DISPLAY   NON-DISPLAY        DELETE
602                            603                604

FIG. 7

REGISTRATION OF NEW BUTTON

FIXED ADDRESS SCAN                708 — OK    CANCEL

BUTTON NAME : [Application C] — 701          703
SENDING DESTINATION : [            ]         ADD
                                    702
LIST OF SENDING DESTINATIONS :  [******@***.co.jp]    705
704                                          EDIT

DELETE
                                             706

KEYWORD TO BE ASSIGNED TO FILENAME :   [報告書] — 707

FILENAME IS "KEYWORD _ DATE _ TIME.pdf"

FIG. 8

FIXED ADDRESS SCAN

[REGISTRATION OF NEW BUTTON]

BUTTON NAME

Application A       DISPLAY   [NON-DISPLAY]   [DELETE]

Application C       DISPLAY   [NON-DISPLAY]   [DELETE]

INFORMATION PROCESSING APPARATUS THAT DISPLAYS A CONFIRMATION SCREEN IF DISPLAY LANGUAGES OF A SCREEN AND AN OPERATION OBJECT DO NOT MATCH, METHOD OF CONTROLLING THE SAME, AND STORAGE MEDIUM

BACKGROUND OF THE INVENTION

Field of the Invention

The present invention relates to an information processing apparatus, a method of controlling the same, and a storage medium.

Description of the Related Art

Image forming apparatuses provided with transmission functions such as fax transmission, email transmission and file transmission in addition to print, copy and scan functions are in widespread use. Also, image forming apparatuses have come onto the market that are provided with an application framework for operating arbitrary applications on firmware, and are able to add arbitrary applications at a later date, in addition to the default applications provided at the time of shipment. In recent years, applications that execute a plurality of functions with the touch of a button, that is, so-called one touch solutions, have been actively developed, in order to simplify user operations.

Japanese Patent Laid-Open No. 2009-205325 describes a technology for determining the filename of scanned image data, in accordance with a predetermined naming rule, and saving the image data to a predetermined storage location folder. This naming rule enables a filename to be generated by combining a predetermined keyword with the creation date, for example. Since the user thereby no longer needs to manually input filenames and storage location folders, the load on the user can be reduced.

However, there are problems such as the following with the technology described in the above Japanese Patent Laid-Open No. 2009-205325. For example, in the case where the language that is used for button names and keywords differs from the display language of the display unit, it is possible that the user may not know what an application is for. In such cases, there is a risk that when the user touches a certain button in order to confirm what the application is for, for example, the function corresponding to the button will be activated and processing that is not intended by the user will be executed.

SUMMARY OF THE INVENTION

An aspect of the present invention is to eliminate the above-mentioned problem with conventional technology.

A feature of the present invention is to provide a technique that, in the case where a language notation of pointing tools that are displayed on a screen differs from the display language of the screen, prevents an instruction being given to a pointing tool that a user does not intend to use.

According to a first aspect of the present invention, there is provided an information processing apparatus having a display unit that displays a screen on which a pointing tool corresponding to a function is disposed, the information processing apparatus comprising: a memory device that stores a set of instructions; and at least one processor that executes the instructions stored in the memory to: obtain a display language of the screen; obtain a language of the pointing tool: and in a case where the display language differs from the language, display, on the display unit, a confirmation screen for confirming with a user whether to execute the function corresponding to the pointing tool in response to an instruction given by the user via the pointing tool.

According to a second aspect of the present invention, there is provided a method of controlling an information processing apparatus having a display unit that displays a screen on which a pointing tool corresponding to a function is disposed, the method comprising: obtaining a display language of the screen; obtaining a language of the pointing tool; and in a case where the display language differs from the language, displaying, on the display unit, a confirmation screen for confirming with a user whether to execute the function corresponding to the pointing tool in response to an instruction given by the user via the pointing tool.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a diagram showing an example of an application management screen.

FIG. 6 is a diagram showing an example of a setting screen of Fixed Address Scan.

FIG. 7 is a diagram showing an example of a registration screen for a new button.

FIG. 8 depicts a view showing an example of the setting screen of Fixed Address Scan that is displayed after an OK button is pressed on the screen in FIG. 7.

FIG. 11 depicts a view showing an example of a confirmation screen that is displayed in step S1009.

FIG. 12 depicts a view showing an example of a registration screen for a new button according to another embodiment of the present invention.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Also, a plurality of features may be arbitrarily combined. Note that, in the present embodiment, the image forming apparatus 100 will be described, taking an information processing apparatus according to the present invention as an example.

Figure 1:
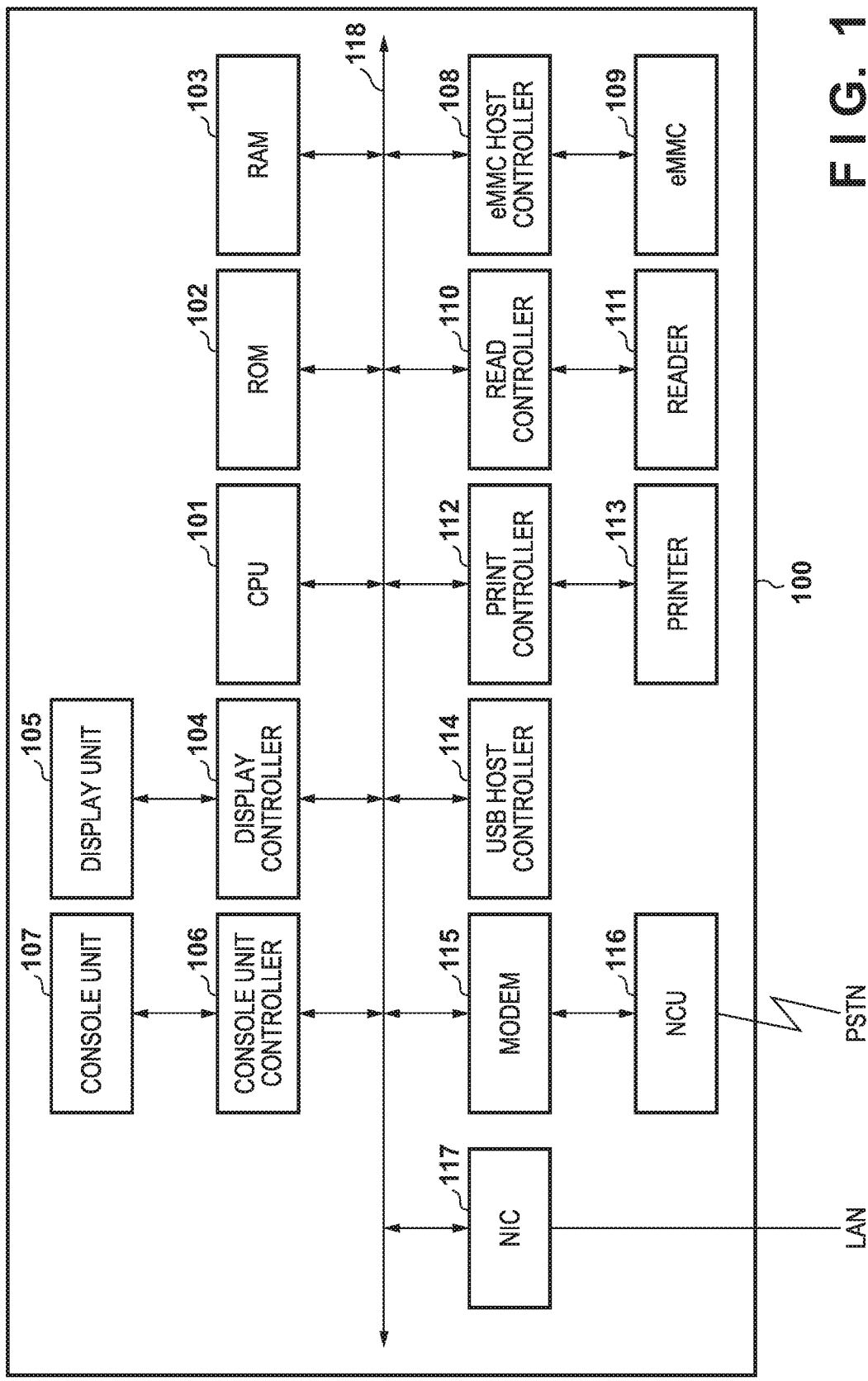
FIG. 1 is a block diagram for describing a hardware configuration of an image forming apparatus according to an embodiment of the present invention.

FIG. 1 is a block diagram for describing a hardware configuration of the image forming apparatus 100 according to an embodiment of the present invention.

The image forming apparatus 100 is provided with a CPU 101, a ROM 102, a RAM 103, a display controller 104, a display unit 105, a console unit controller 106, and a console unit 107. Also, the image forming apparatus 100 is provided with an eMMC host controller 108, an eMMC (embedded MultiMedia Card) 109, a read controller 110, a reader 111, a print controller 112, and a printer 113. Furthermore, the image forming apparatus 100 is provided with a USB host controller 114, a modem 115, a Network Control Unit (NCU) 116, and a Network Interface Card (NIC) 117.

The CPU 101 performs overall control of the devices that are connected to a system bus 118. The CPU 101 executes a boot program stored in the ROM 102 when power is supplied. Usually, the boot program deploys a main program that is saved in a specific area of the eMMC 109 to the RAM 103, and jumps to the head of the deployed main program. The RAM 103 functions as a work area of the CPU 101, and the like, in addition to being the deployment destination of the main program.

The display controller 104 controls drawing to the display unit 105. The display unit 105 is, for example, a full bitmap display unit of WVGA (Wide Video Graphics Array) size. On the other hand, the console unit controller 106 controls input from the console unit 107. The console unit 107 includes a touch panel superimposed on the display unit 105. The reader 111 reads documents. The reader 111 is mounted in an auto document feeder (not shown) as an option, and is able to automatically feed and read a document consisting of a plurality of sheets loaded in the feeder. The reader 111 is connected to the read controller 110, and the CPU 101 interacts with the reader 111 via the read controller 110. Also, the printer 113 is a printer engine that performs image forming (printing) on recording sheets with an electrophotographic method, for example. The printer 113 is connected to the print controller 112, and the CPU 101 interacts with the printer 113 via the print controller 112. The USB host controller 114 is responsible for controlling USB protocols, and mediates access to USB devices such as a USB memory. The modem 115 performs modulation and demodulation of signals required in facsimile communication. Also, the modem 115 is connected to the NCU 116. Signals modulated with the modem 115 are sent to a Public Switched Telephone Network (PSTN) via the NCU 116. The NIC 117 is able to exchange data bidirectionally with a mail server or a file server via a LAN, and the image forming apparatus 100 is thereby able to send and receive email messages and send and receive files. Also, the image forming apparatus 100 is connected to a computer, which is an external terminal, in a manner that enables HTTP communication, and is able to accept execution of jobs such as print jobs from the computer. Also, a Remote User Interface (RUI) can be displayed on a browser, by accessing an IP address of the image forming apparatus 100 from a browser installed on the computer. The user, through operations on the RUI, is able to inquire about the state of the image forming apparatus 100, change settings, and so on. Also, the image forming apparatus 100 of the embodiment is provided with the eMMC 109 as storage. The CPU 101 accesses the eMMC 109 via the eMMC host controller 108.

Figure 2:
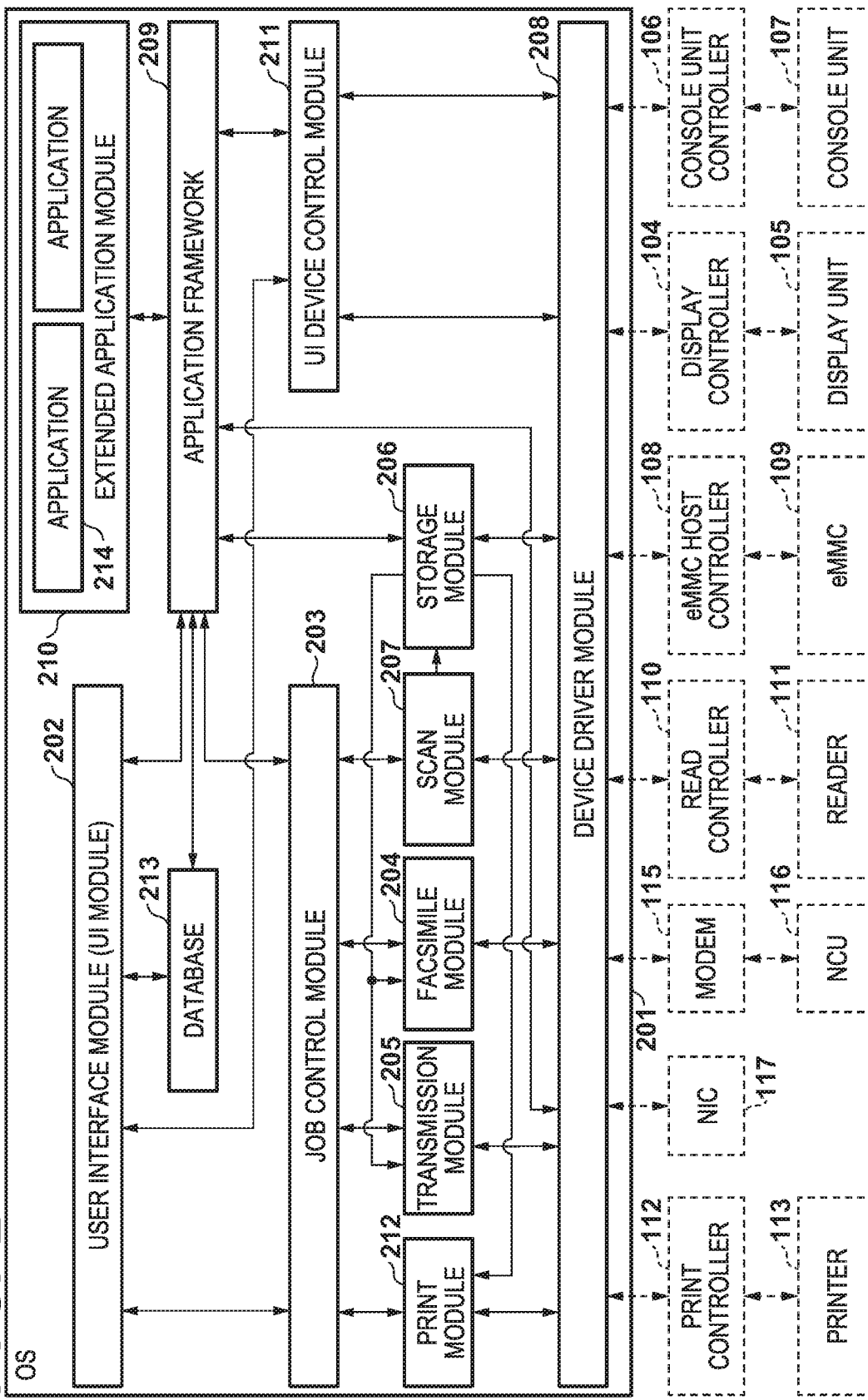
FIG. 2 is a functional block diagram for describing a software configuration of the image forming apparatus according to the embodiment.

FIG. 2 is a functional block diagram for describing a software configuration of the image forming apparatus 100 according to the embodiment. The modules indicated with solid lines in FIG. 2 are software modules that are realized by the CPU 101 executing the aforementioned boot program and executing the main program deployed in the RAM 103.

Execution of the various modules of the main program discussed later is managed and controlled by an operating system (OS) 201. A device driver module 208 is combined with the OS 201. The device driver module 208 mediates interaction with hardware devices such as the display controller 104, the console unit controller 106, and the read controller 110.

A user interface module (UI module) 202 provides various information to the user via the display unit 105 and the console unit 107, and accepts various instructions from the user. Various settings that switch the behavior of the image forming apparatus 100 can also be changed by the UI module 202. The various settings changed by the UI module 202 are physically stored in the eMMC 109 via a database 213. These settings also include setting of the display language of the display unit 105. The UI module 202 selects a character set that is used for display on the display unit 105, in accordance with the display language setting.

A job control module 203 accepts jobs such as copy, print and fax jobs, and controls execution of the accepted jobs. A storage module 206 is a software module that physically stores data such as images sent and received by fax and application settings requested by an extended application module 210, for example, in the eMMC 109, and manages the stored data.

In the image forming apparatus 100 according to the embodiment, when the job control module 203 accepts a fax transmission job, a scan module 207 receives a job request and controls the reader 111 to scan the document. Image data for facsimile transmission obtained by scanning is then stored by the storage module 206. The image data for transmission stored by the storage module 206 is read out by a facsimile module 204, and transmitted by facsimile to a sending destination via the modem 115 and the NCU 116. Also, image data received by facsimile from a communication partner via the modem 115 and the NCU 116 is imported by the facsimile module 204, and stored by the storage module 206.

Also, this image forming apparatus 100 has a transmission function. The transmission function, in addition to fax transmission, includes email transmission such as Scan to Email and Internet fax (IFAX) and file transmission such as Scan to SMB, by a transmission module 205.

Furthermore, the image forming apparatus 100 of the embodiment is provided with an application framework 209. The extended application module 210 is physically disposed on the eMMC 109, and stores a plurality of applications 214 consisting of arbitrary programs written in a script language, and the like. For example, language systems such as Java (registered trademark), which is an interpreter for interpreting and executing bytecodes, and Lua may be used. The application framework 209 is responsible for installing arbitrary programs written in a script language or a predetermined high-level language on the extended application module 210, or uninstalling installed programs from the extended application module 210. At the same time, status information of the installed applications 214 including whether the applications 214 are enabled or disabled is held by the storage module 206. The application framework 209 is also provided with the ability to, in the case where an archive containing a plurality of preinstalled applications in a compressed state exists on the ROM 102, decompress and install these applications on the extended application module 210 as necessary. The application framework 209, on receiving selection of a button displayed on the display unit 105, loads the script language of the corresponding application 214 to the RAM 103, and interprets and executes the loaded application with the CPU 101. The image forming apparatus 100 is thereby able to readily realize arbitrary functions such as a login application and a language switching application, while maintaining the removability of functions. Furthermore, the application framework 209, on receiving a request from an arbitrary program installed on the extended application module 210, refers to or changes various setting values on the database 213.

The application framework 209 acts as an intermediary between functions that are realized by arbitrary programs installed on the extended application module 210 and existing functions. As aforementioned, the image forming apparatus 100 has functions of fax transmission, email transmission, and file transmission. The application framework 209 provides these functions as an Application Programming Interface (API). Arbitrary applications 214 installed on the extended application module 210 can thereby use the fax transmission, email transmission and file transmission functions without newly implementing these functions.

A UI device control module 211 mediates output of various information from the UI module 202 and the extended application module 210 to the display unit 105, and transmission of user operations by the console unit 107 to the UI module 202 and the extended application module 210. The print module 212, in the case where the job control module 203 instructs printing after accepting a facsimile reception job or when a copy instruction or the like is accepted via the UI module 202, controls the printer 113 via the print controller 112 to execute printing.

Figure 3:
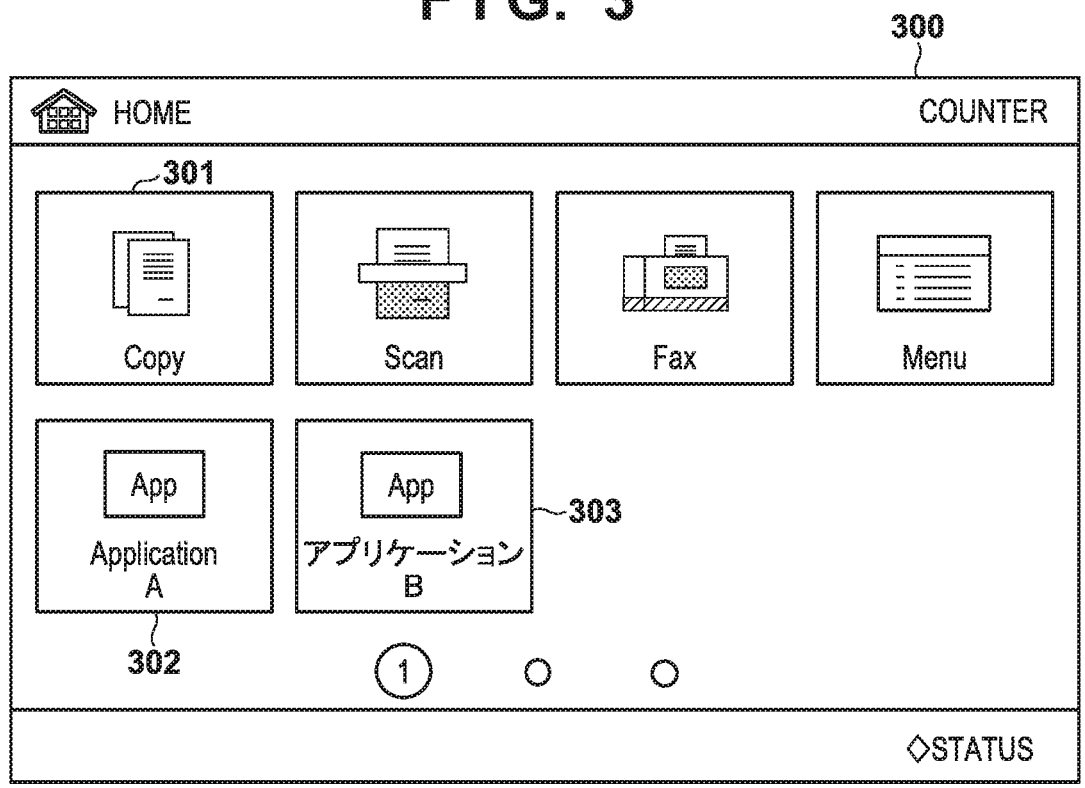
FIG. 3 is a diagram showing an example of a home screen that is displayed on a display unit of an image forming apparatus of the embodiment.

FIG. 3 is a diagram showing an example of a home screen 300 that is displayed on the display unit 105 of the image forming apparatus 100 of the embodiment.

In the example in FIG. 3, the display language of this home screen 300 is set to English. Six buttons are displayed on this home screen 300, with the four buttons on the upper side corresponding to the applications of functions that the image forming apparatus 100 is originally provided with. Here, since the display language is set to English, the button name of a copy button 301 is written as "Copy" in English, for example. The applications of functions that the image forming apparatus 100 is originally provided with have button names corresponding to a language that is settable as the display language, and thus, in the case where the display language is switched, the button names are also changed in correspondence with the display language switched to.

In contrast, the two buttons 302 and 303 on the lower side are buttons corresponding to applications added to the extended application module 210. Here, the added applications only have the button names set in the display language at the time that the buttons were registered (registration of buttons will be discussed later). The button 302 has "Application A" as the button name in English notation. On the other hand, an application B of the button 303 only has the button name " アプリケーション B" (Application B) in Japanese notation. Thus, even in the case where the display language of the home screen 300 is set to English as shown in FIG. 3, the button name of the button 303 is written in Japanese. In this way, in the case where the display language that is set for the screen differs from the language notation in which the button name is displayed, there is a risk of cases occurring where the user does not understand the meaning of buttons that are displayed.

An application called Fixed Address Scan is given as an example of an application 214 applicable to the embodiment. Fixed Address Scan is an application that converts scanned data into a PDF file, attaches a filename using a keyword set in advance and the date and time, and transmits the PDF file by email to a sending destination registered in advance.

Hereinafter, a procedure for newly registering a button corresponding to the function of Fixed Address Scan on the home screen with the button name "Application C" will be described, with reference to FIGS. 4 to 9.

Figure 4:
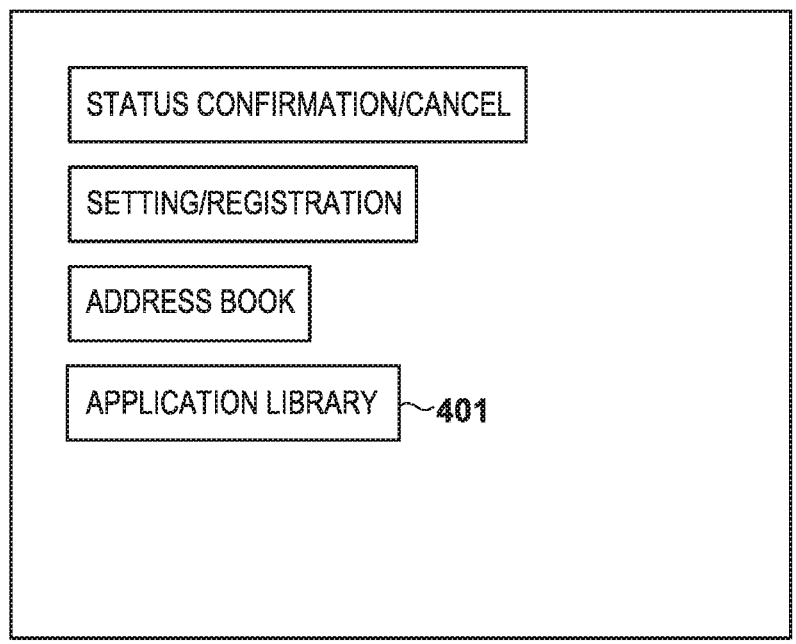
FIG. 4 is a diagram showing a display example of a top page of an RUI that is displayed by a browser of a computer that is communicable with the image forming apparatus according to the embodiment.

FIG. 4 depicts a view showing a display example of the top page of an RUI that is displayed by the browser of a computer capable of communicating with the image forming apparatus 100 according to the embodiment. As aforementioned, an RUI can be displayed on a browser installed on a computer, which is an external terminal, by accessing the IP address of the image forming apparatus 100 from the browser. Note that user authentication may be performed, when the IP address of the image forming apparatus 100 is accessed from the browser. An application management screen such as shown in FIG. 5, for example, is displayed when an application library button 401 is pressed.

FIG. 5 depicts a view showing an example of the application management screen.

This application management screen displays a list of applications for which a button can be registered in the image forming apparatus 100. Here, Fixed Address Scan 501 is displayed as the application name. Here, when the user presses a disable button 502, a button corresponding to Fixed Address Scan can no longer be registered on the home screen that is displayed by the image forming apparatus 100. Also, in the case where a button corresponding thereto was displayed on the home screen, the button is hidden. When Fixed Address Scan 501, which is the application name, is pressed on this screen, a setting screen for Fixed Address Scan such as shown in FIG. 6, for example, is displayed.

FIG. 6 depicts a view showing an example of the setting screen for Fixed Address Scan.

In the example in FIG. 6, a button for Fixed Address Scan has already been registered with a button name 602 "Application A". Here, by the user pressing a non-display button 603, the button that is displayed on the home screen displayed by the image forming apparatus 100 can be hidden. By pressing a delete button 604, the button "Application A" can also be deleted from the home screen. When a registration button 601 of a new button is pressed, a registration screen of a new button such as shown in FIG. 7, for example, is displayed.

FIG. 7 depicts a view showing an example of the registration screen of a new button.

Here, the name of the button corresponding to Fixed Address Scan can be input to a text box 701 of a button name. Here, the button name "Application C" has been input, and a button corresponding to Fixed Address Scan is displayed on the home screen of the image forming apparatus 100 with the name "Application C". An email address of a sending destination for transmission with Fixed Address Scan is input to a text box 702 for sending destinations. When the adding button 703 is pressed, the email address of the sending destination input to the text box 702 is added to a list of sending destinations 704. Also, pressing an edit button 705 in a state where an email address has been selected from the list of sending destinations 704 enables the selected email address to be edited. Also, when a deletion button 706 is pressed, the selected email address can be deleted.

The keyword to be assigned to the filename is input to the text box 707. The filename "keyword_date_time.pdf" is assigned in the example in FIG. 7. In the example in FIG. 7, the Japanese word "報告書" (report) is input as the keyword. Accordingly, in the case where "Application C" is executed at 11:11:11 on Nov. 11, 2018, for example, the filename "報告書 20181111 111111" is attached to the file to be transmitted at that time. An OK button 708 is a button for confirming the settings on this screen, and when this OK button 708 is pressed, "Application C" is added to the button names on the Fixed Address Scan setting screen.

FIG. 8 depicts a view showing an example of the setting screen for Fixed Address Scan that is displayed after the OK button 708 is pressed on the screen in FIG. 7.

Here, as is clear on comparison with FIG. 6, "Application C" has been newly registered as a button for executing Fixed Address Scan.

Figure 9:
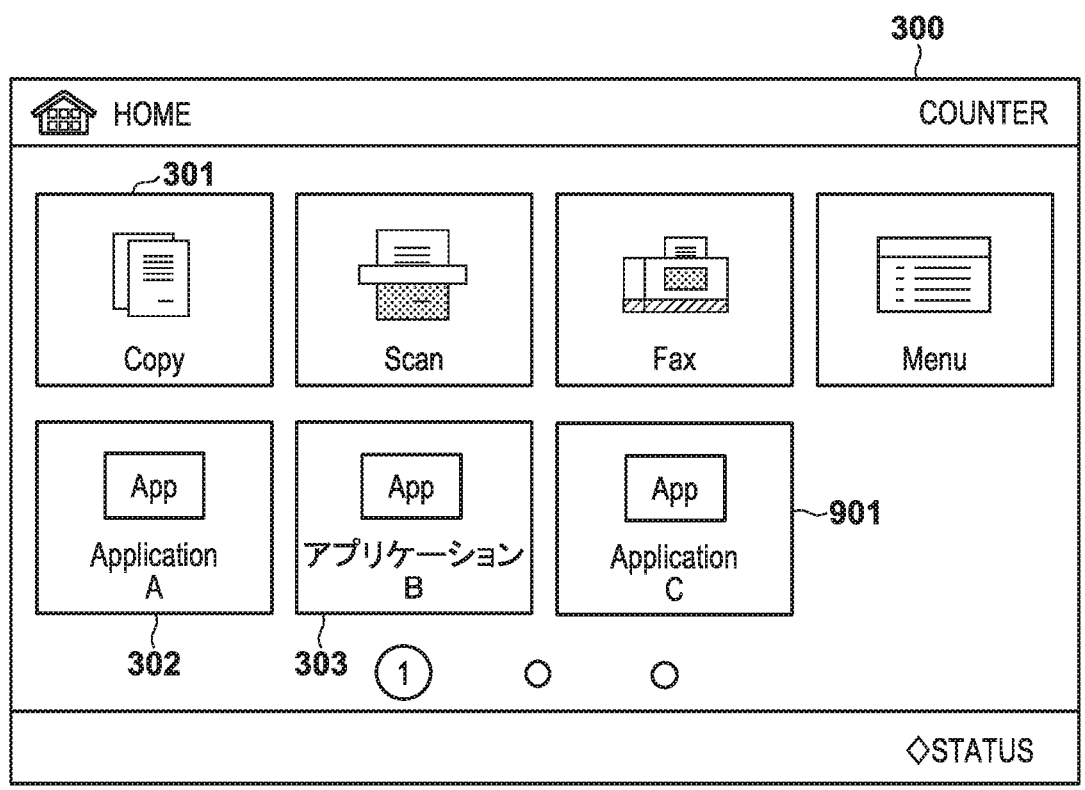
FIG. 9 depicts a view showing an example of a home screen displayed on the display unit of the image forming apparatus according to the embodiment.

FIG. 9 depicts a view showing an example of the home screen 300 displayed on the display unit 105 of the image forming apparatus 100 according to the embodiment. Note that, here, portions that are in common with FIG. 3 are given the same reference number, and description thereof is omitted.

Here, a button 901 of the button name "Application C" corresponding to Fixed Address Scan has been added, in accordance with the aforementioned FIGS. 4 to 8.

Here, when the button 901 is pressed, Fixed Address Scan is executed, in accordance with the contents set on the registration screen of a new button in FIG. 7. At this time, the Japanese word "報告書" is set as the keyword that is used by "Application C", and, in such a case, it is highly likely that a Japanese person is envisaged as the user of "Application C". For example, it is highly likely that someone from Europe or America who selects English as the display language will not understand the meaning of the Japanese word "報告書" that is set as the keyword, and there is also a risk that he or she will not know what the button 901 is for. Accordingly, if the person presses the button 901 with the intension of checking what the button 901 is for, Fixed Address Scan will be started and processing from reading of a document to transmission will end up being executed, and there is a risk that data that should not be transmitted will be transmitted by mistake.

In view of this, the application 214 added to the extended application module 210 according to the embodiment compares the language of the button name or the keyword or both with the display language of the screen. In the case where the language of the button name or the keyword differs from the display language of the screen, a confirmation screen for confirming with the user whether to execute the application 214 is displayed. An erroneous operation such as mistakenly transmitting data that should not be transmitted, for example, due to pressing a button without knowing what function the button corresponds to can thereby be prevented.

Figure 10:
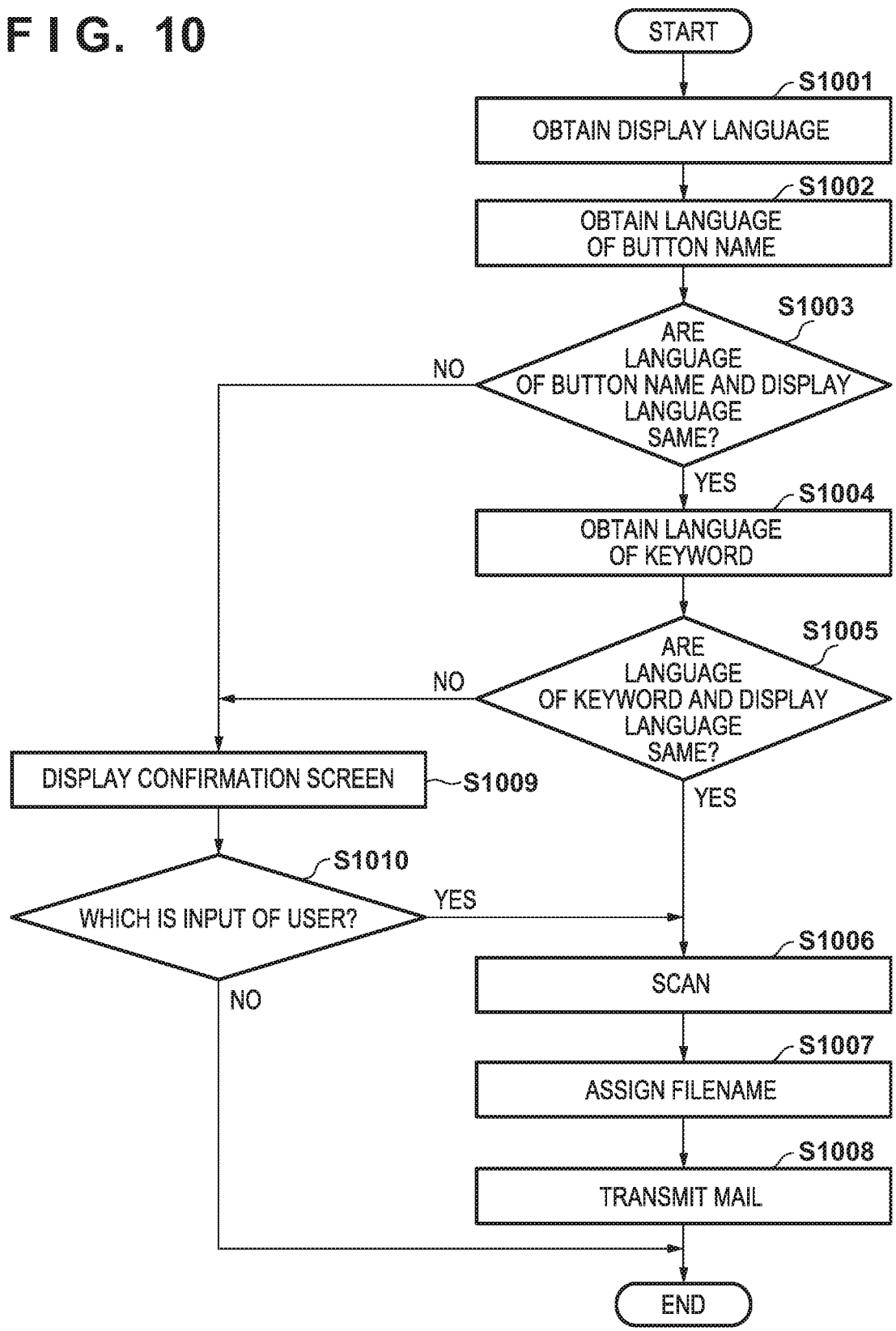
FIG. 10 is a flowchart for describing processing by the image forming apparatus according to the embodiment.

FIG. 10 is a flowchart for describing processing by the image forming apparatus 100 according to the embodiment. For example, here, description will be given, taking the aforementioned Fixed Address Scan as an example. Note that this processing is achieved by the CPU 101 deploying and executing the application 214 added to the extended application module 210 in the RAM 103. More specifically, the user interface module (UI module) 202 provides various information to the user via the display unit 105 and the console unit 107, and accepts various instructions from the user. The application framework 209, on receiving selection of a button displayed on the display unit 105, deploying the script language of the corresponding application 214 in the RAM 103, and executes processing with the CPU 101. This processing is started by the CPU 101 accepting, via the console unit 107, that the button 901 (refer to FIG. 9) of Fixed Address Scan displayed on the display unit 105 was pressed.

First, in step S1001, the CPU 101 obtains the display language of the home screen that is currently displayed on the display unit 105 from among the settings relating to display language on the database 213. Here, the display language is assumed to be English, as shown in the example in FIG. 9. Next, the processing advances to step S1002, where the CPU 101 obtains the language notation of the button name displayed on the home screen that is instructed by the user. At this time, the application framework 209 provides, to the application 214, an API specifying the language of an arbitrary character string. An API that specifies the language by collating as to the character set of the language in which the arbitrary character string of the button name is included is given as an example. Next, the processing advances to step S1003, where the CPU 101 compares the language of the button name with the display language of the home screen, and the processing advances to step S1004 if the language and the display language are the same, and to step S1009 if the language and the display language are different from each other. In step S1009, the CPU 101 displays, on the display unit 105, a confirmation screen (e.g., refer to FIG. 11) for confirming the intention of the user with regard to using the application 214, in view of the possibility that the user may not understand what the application 214 is for.

FIG. 11 depicts a view showing an example of the confirmation screen that is displayed in step S1009.

In FIG. 11, since the display language of the present screen is English, a message is displayed in English. On this screen, the user is asked whether to transmit the following file (here, filename "A中請書_20161205111245.pdf") to the address indicated by the following email address (here, "**.mail.com"). Here, when a YES button 1102 (i.e., instructing to use the application) is pressed, the processing advances from step S1010 to step S1006, and when a NO button 1103 (i.e., instructing not to use the application) is pressed, this processing is ended and the home screen is displayed on the display unit 105. Note that, here, if the display language of the current screen is Japanese, the message on the confirmation screen of FIG. 11** will be displayed in Japanese.

In step S1004, the CPU 101, similarly to step S1003, obtains the language of the keyword (refer to FIG. 7) that is set for the button instructed by the user, using the API. The processing then advances to step S1005, where the CPU 101 compares the language of the keyword with the display language of the screen, and the processing advances to step S1006 if the language and the display language are the same, and to step S1009 if the language and the display language are different from each other. The operations after advancing to step S1009 are as aforementioned.

In step S1006, the CPU 101 implements image scanning, using the API provided by the application framework 209, in order to execute Fixed Address Scan corresponding to the button. The processing then advances to step S1007, where the CPU 101 assigns a filename to the scanned image data, in accordance with the contents set on the registration screen of a new button in FIG. 7. The processing then advances to step S1008, where the CPU 101 transmits the file to the email address of the sending destination registered on the registration screen of a new button in FIG. 7, using the API provided by the application framework 209.

Note that, in the embodiment, the languages of both the button name and the keyword are compared with the display language in step S1003 and step S1006, but one of these two languages need only be compared.

Also, in the embodiment, description was given taking Fixed Address Scan as an example, but the application scope of the present invention is not limited thereto. For example, the function that is executed after comparing the language of the button name or the keyword with the display language may be printing. Also, the transmission function may alternatively be file transmission such as Scan to SMB, rather than email transmission such as Scan to Email or Internet fax (IFAX).

Also, the method of specifying the language of the button name or the keyword may be a method that involves the language being recorded in the database 213 when registering the button name and the keyword, and an API for specifying the language referring to the settings on the database 213.

FIG. 12 depicts a view showing an example of the registration screen of a new button according to another embodiment of the present invention. Here, a check box 1201 is provided, in addition to the aforementioned configuration in FIG. 9.

This check box 1201 is used in setting whether to display a confirmation screen such as shown in FIG. 11, for example, as aforementioned, when a button displayed on the home screen is pressed and the application corresponding to the button is started. Here, when the OK button 708 is pressed after checking the check box 1201, the confirmation screen will always be displayed when this button is pressed, irrespective of the language of the keyword or the button name of the button corresponding to Fixed Address Scan that corresponds to this screen in FIG. 12. Also, the confirmation screen is displayed in the case where the language of the keyword or the button name of that button differs from the display language, as described in the aforementioned embodiment, even if this check box 1201 is not checked.

According to the embodiment as described above, in the case where the language that is used for the button name, the keyword used by the application, or the like differs from the display language of the screen that displays the button, a screen for prompting the user to confirm whether to execute the function of the button can be displayed to the user. Even in the case where the user is not able to comprehend the function of a button that is displayed due to the display language being different from the language of the button name, the effect of being able to prevent processing not intended by the user from being executed due to mistakenly pressing the button is obtained.

Note that, in the above-mentioned embodiment, description is given taking buttons as an example of a pointing tool for instructing execution of functions displayed on the screen, but this pointing tool may be icons or the like, for example.

Other Embodiments

Embodiments of the present invention can also be realized by a computer of a system or apparatus that reads out and executes computer executable instructions (e.g., one or more programs) recorded on a storage medium (which may also be referred to more fully as a non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-022947, filed Feb. 12, 2019, which is hereby incorporated by reference herein in its entirety.

What is claimed is:

1. An information processing apparatus comprising:
a memory device that stores a set of instructions; and
at least one processor that executes the instructions stored in the memory to:
   display a screen;
   obtain a first display language of the screen that is able to be changed in accordance with an instruction for changing a language;
   obtain a second display language of an operation object to be displayed on the screen, wherein the second display language of the operation object is set in advance to the operation object;
   display a confirmation screen for confirming whether or not to execute processing set for the operation object in accordance with a designation of the operation object in a case that the first display language and the second display language do not match; and
   execute the processing set for the operation object in accordance with the designation of the operation object without displaying the confirmation screen in a case that the first display language and the second display language match.

2. The information processing apparatus according to claim 1, wherein the confirmation screen is displayed in accordance with the first display language of the screen.

3. The information processing apparatus according to claim 1, wherein the confirmation screen includes a message describing a function corresponding to the operation object.

4. The information processing apparatus according to claim 3, wherein, in a case where the function corresponding to the operation object further includes a data transmission function for transmitting data, the confirmation screen includes information relating to a transmission destination of the data.

5. The information processing apparatus according to claim 3, wherein, in the obtaining of the second display language of the operation object, the at least one processor executes the instructions to obtain the second display language of the operation object, based on a language of a name that is set to the operation object or a language included in a name used by the function corresponding to the operation object.

6. The information processing apparatus according to claim 5, wherein, in a case where the function corresponding to the operation object includes a data transmission function for transmitting data, the name used by the function includes a filename of the data.

7. The information processing apparatus according to claim 1, wherein the at least one processor executes the instructions further to:
configure settings such that a screen for confirming with the user whether to execute the function corresponding to the operation object is displayed on a display unit in response to an instruction given by the user via the operation object, irrespective of whether the first display language and the second display language do not match.

8. The information processing apparatus according to claim 1, wherein the operation object is a button or an icon.

9. The information processing apparatus according to claim 1, wherein the at least one processor further executes the instructions stored in the memory to execute the processing set for the operation object in accordance with a user instruction after displaying the confirmation screen in a case that the first display language and the second display language do not match.

10. A method of controlling an information processing apparatus having a display unit, the method comprising:
obtaining a first display language of the screen that is able to be changed in accordance with an instruction for changing a language;
obtaining a second display language of an operation object to be displayed on the screen, wherein the second display language of the operation object is set in advance to the operation object;
displaying a confirmation screen for confirming whether or not to execute processing set for the operation object in accordance with a designation of the operation object in a case that the first display language and the second display language do not match; and
executing the processing set for the operation object in accordance with the designation of the operation object without displaying the confirmation screen in a case that the first display language and the second display language match.

11. The method according to claim 10, wherein the confirmation screen is displayed in accordance with the first display language of the screen.

12. The method according to claim 10, wherein the confirmation screen includes a message describing a function corresponding to the operation object.

13. The method according to claim 12, wherein, in a case where the function corresponding to the operation object further includes a data transmission function for transmitting data, the confirmation screen includes information relating to a transmission destination of the data.

14. The method according to claim 12, wherein, in the obtaining of the second display language of the operation object, the second display language of the operation object is obtained based on a language of a name that is set to the operation object or a language included in a name used by the function corresponding to the operation object.

15. The method according to claim 14, wherein, in a case where the function corresponding to operation object includes a data transmission function for transmitting data, the name used by the function includes a filename of the data.

16. The method according to claim 10, further comprising:
settings such that a screen for confirming with a user whether to execute the function corresponding to the operation object is displayed on a display unit in response to an instruction given by the user via the operation object, irrespective of whether the first display language and the second display language do not match.

17. The method according to claim 10, wherein the operation object is a button or an icon.

18. A non-transitory computer-readable storage medium storing a program for causing a processor to execute a method of controlling an information processing apparatus having a display unit, the method comprising:
obtaining a first display language of the screen that is able to be changed in accordance with an instruction for changing a language;
obtaining a second display language of an operation object to be displayed on the screen, wherein the second display language of the operation object is set in advance to the operation object;
displaying a confirmation screen for confirming whether or not to execute processing set for the operation object in accordance with a designation of the operation object in a case that the first display language and the second display language do not match; and
executing the processing set for the operation object in accordance with the designation of the operation object without displaying the confirmation screen in a case that the first display language and the second display language match.

19. An information processing apparatus comprising:
a memory device that stores a set of instructions; and
at least one processor that executes the instructions stored in the memory to:
display a screen;
obtain a first display language of the screen that is able to be changed in accordance with an instruction for changing a language;
obtain a second display language of a name of an operation object to be displayed on the screen, wherein the second display language of the name of the operation object is set in advance to the operation object;
display a confirmation screen for confirming whether or not to execute processing set for the operation object in accordance with a designation of the operation object in a case that the first display language and the second display language do not match;
execute the processing set for the operation object in accordance with the designation of the operation object without displaying the confirmation screen in a case that the first display language and the second display language match.

20. The information processing apparatus according to claim 19, wherein the processing set for the operation object is processing for transmitting data, and
wherein a file name attached to the data includes the name of the operation object.

21. The information processing apparatus according to claim 19, wherein the at least one processor that executes the instructions stored in the memory further to execute the processing set for the operation object in accordance with a user instruction after displaying the confirmation screen in a case that the first display language and the second display language do not match.

* * * * *